Oct. 13, 1953          J. VILLARS          2,655,223

LIFTING DEVICE FOR VEHICLES

Filed March 1, 1950          4 Sheets-Sheet 1

INVENTOR
Julio Villars.

BY

ATTORNEY

Oct. 13, 1953    J. VILLARS    2,655,223
LIFTING DEVICE FOR VEHICLES
Filed March 1, 1950    4 Sheets-Sheet 2
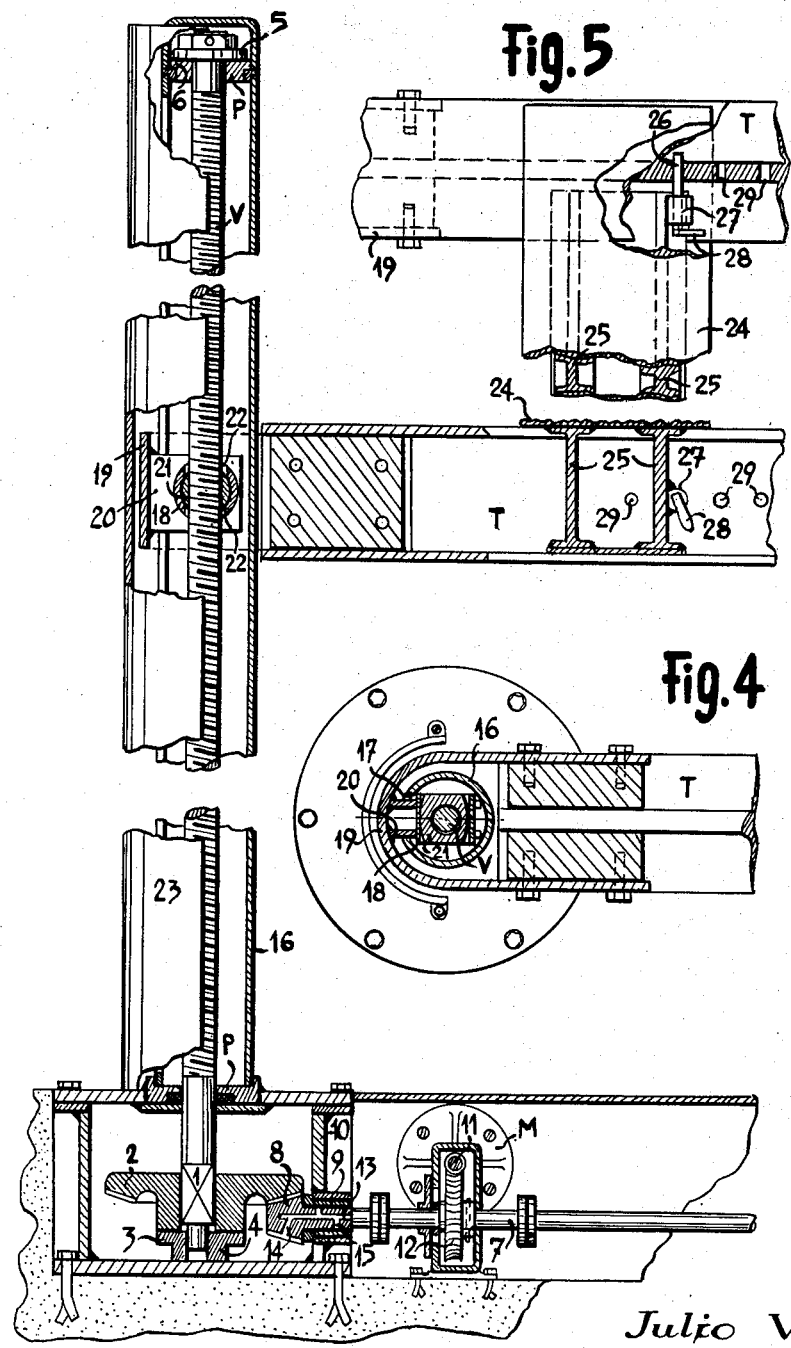
INVENTOR
Julio Villars.
BY 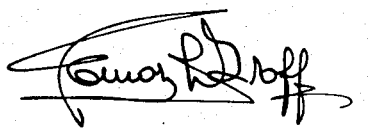
ATTORNEY Oct. 13, 1953  J. VILLARS  2,655,223
LIFTING DEVICE FOR VEHICLES
Filed March 1, 1950  4 Sheets-Sheet 3
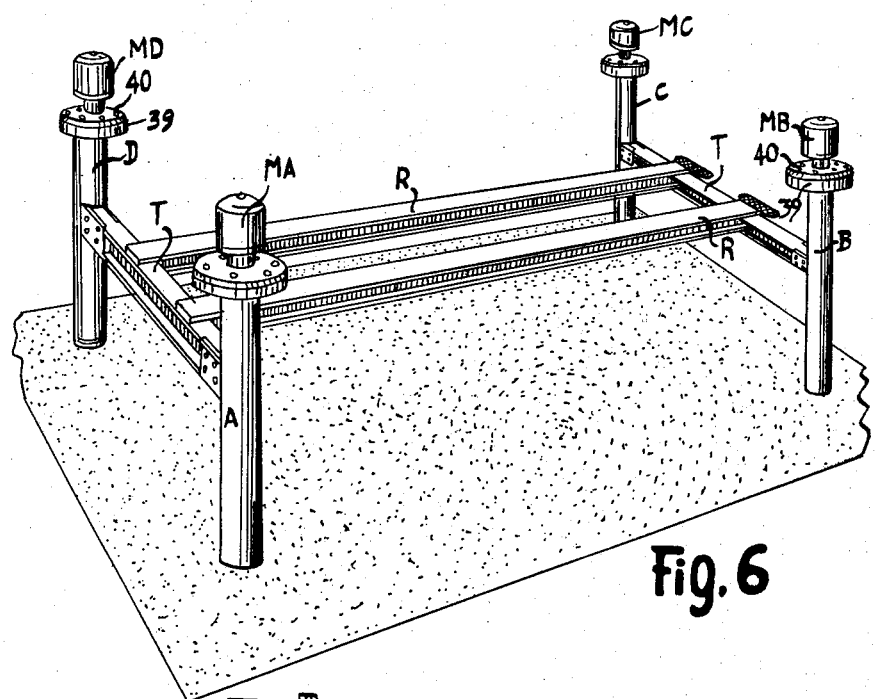
Fig. 6
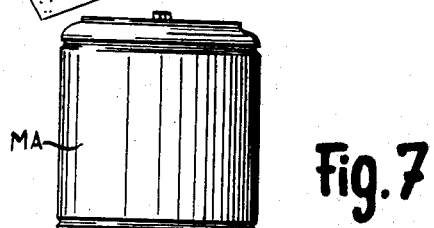
Fig. 7
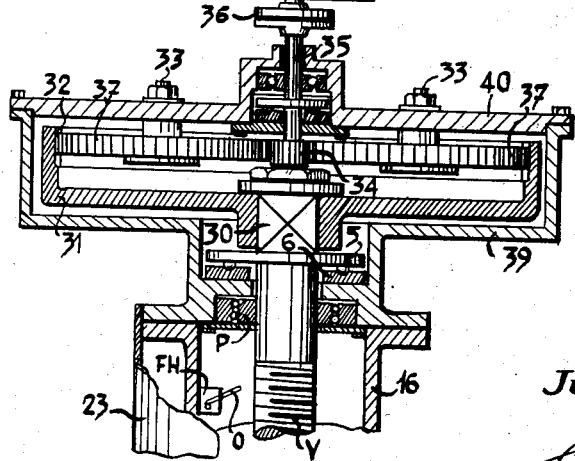
INVENTOR
Julio Villars.
BY
ATTORNEY Oct. 13, 1953  J. VILLARS  2,655,223
LIFTING DEVICE FOR VEHICLES
Filed March 1, 1950  4 Sheets-Sheet 4

INVENTOR
Julio Villars.

BY

ATTORNEY

Patented Oct. 13, 1953

2,655,223

UNITED STATES PATENT OFFICE 2,655,223

LIFTING DEVICE FOR VEHICLES

Julio Villars, Versoix, Switzerland

Application March 1, 1950, Serial No. 147,002
In Switzerland January 16, 1950

9 Claims. (Cl. 187—8.59)

1

There exist actually a very great number of lifting devices for various types of vehicles. Certain of these comprise four columns between which moves, vertically and parallel to itself, a platform of movable outfit. In the most modern appliances, this platform is composed of two runways resting on two cross-bars whose ends are mechanically connected to operating members housed in the columns. These operating members may be formed either by cables passing over grooved pulleys mounted on the upper ends of the columns and each winding round a drum mechanically connected to a motor, or by screws turning in bearings located at the two ends of the columns and bearing on axial thrust bearings secured to the foot of each of the columns. These screws are generally mechanically connected to a motor by transmission shafts and angle pinions housed in troughs. Now, in these two types, it is necessary to strut the four columns one with the other and to provide a safe anchorage of their bases in the ground, capable of resisting the horizontal overturning forces to which they are subjected during the lifting of a vehicle. It is obvious that such braces or struts are very hindering for the traffic in the building and in certain cases, particularly in the case of heavy vehicles (motor-buses, etc.) which have a great height, these struts completely stand in the way, not only of the passage of the vehicle across the elevator, but also of the positioning of the same on the runways.

The present invention has for object a lifting device comprising two runways resting on two cross-bars whose ends are mechanically connected to four operating members housed in four columns. This device differs from known devices by the fact that each operating member is composed of a suspended screw bearing against an axial thrust bearing mounted on the upper end of each column, that each screw co-operates with a nut free to swivel relative to a support secured to each of the ends of the cross-bars, and that each column rests through its base on the ground and is connected to the other columns solely through the ground to the exclusion of any other rigid bracing or strut member, these columns being subjected practically only to forces vertically directed and tending to press them against the ground.

The accompanying drawing shows diagrammatically and by way of example two embodiments of the device.

Fig. 1 is a perspective view of a first embodiment.

2

Fig. 3 is a view in axial section of a column.

Figs. 4 and 5 are detail views.

Fig. 6 is a perspective view of the lifting device according to a second embodiment.

Figs. 7 and 8 are detail views.

Figure 1:
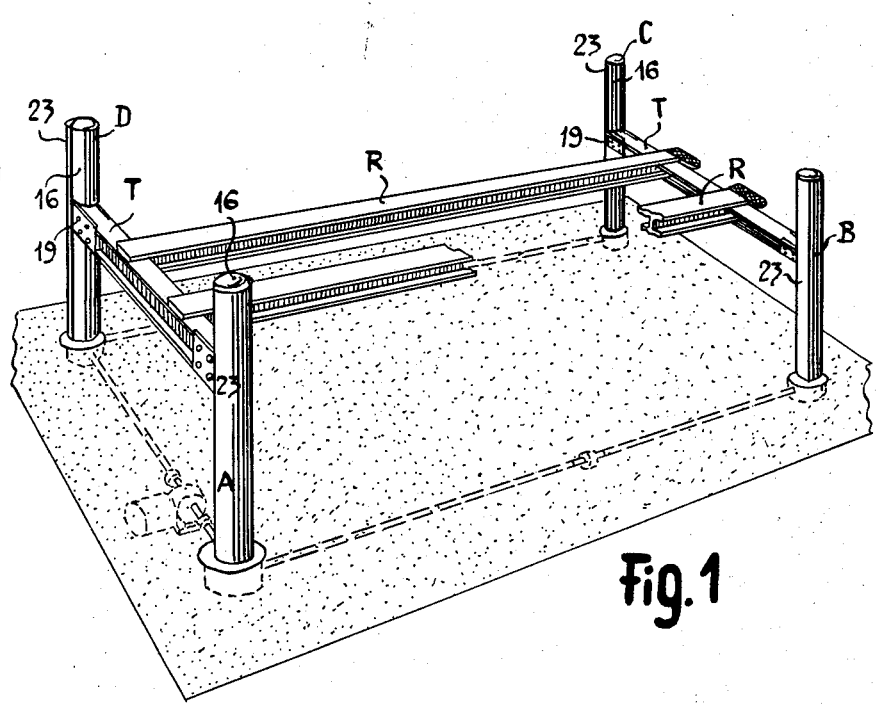
Figure 2:
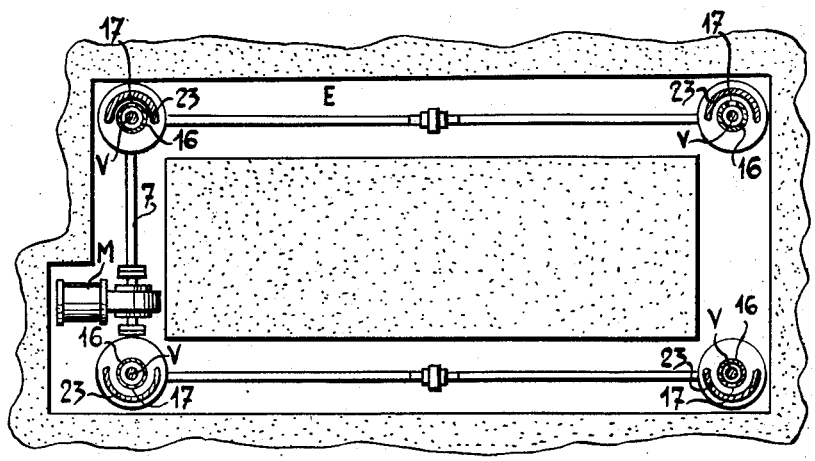
Fig. 2 is a plan view of the same, the troughs being open and the movable outfit withdrawn.

According to Figs. 1 to 5 of the accompanying drawing, the lifting device comprises four columns A, B, C, D resting through their base on the ground and between which moves a movable outfit comprising two runways R resting on two cross-bars T. Each column protects and acts as a suspension member for an operating member formed by a screw V (Fig. 3) turning in bearings P arranged at the top and at the foot of each column. The lower part of each operating member is provided with a part 1, grooved or of polygonal cross section, on which is mounted a crown 2 resting on an axial thrust bearing 3. The lower end of each screw V has a smaller diameter and turns in a bearing or guide 4. Finally, the upper end of each screw V carries a plate 5 resting on an axial thrust bearing 6 mounted in the upper part of each column.

The crowns 2 are mechanically connected one with the other by transmission shafts 7 placed in troughs or channels E and carrying a pinion 8 fixed to each of their ends. Each pinion meshes with a crown 2 and is provided with a hub rotating in a bearing 9 disposed in the walls of a watertight casing 10. A motor M, housed in the ground, drives one of the transmission shafts through the intermediary of an endless screw 11 meshing with a screw wheel 12 secured to one of the transmission shafts 7. The pinions 8 are provided with an axial hole 13 which communicates with the groove of a tooth by means of a conduit 14. Radial conduits 15 connect this axial bore 13 with the bearing surfaces of the bearings 9.

Each column comprises a tube 16 provided with a longitudinal aperture 17 (Fig. 4). A support 18, formed by a piece of tubing with a horizontal axis, is rigidly fixed to a flange 19 by means of securing elements 20 crossing the aperture 17. Each flange 19 has a general U-shape and is rigidly fixed through its legs to one of the ends of a cross-bar T. In the support 18 is placed a nut 21 engaged on the screw V whose axis of rotation is approximately perpendicular to the axis of the tube 18. This nut is shaped like a barrel and may therefore swivel freely within the tube 18. Openings 22 (Fig. 5), formed in the walls of this tube 18, allow the passage of the screw V. A protecting element 23, of semi-cylindrical shape, is arranged opposite each aperture 17.

The operation of the lifting device described is the following:

When the motor M is under tension, it drives the transmission shafts 7 and rotates the screws V. As a result, the four nuts 21, in engagement with the four screws V, rise or fall along the latter and draw along the movable outfit in a vertical movement parallel to itself. From an examination of the drawing, it will be seen that this movable outfit is suspended from the four columns, the screws V bearing against the axial thrust bearing 6 fixed to the tops of the said columns. As a result, the screws are not subjected to any buckling stress, as is the case when the axial thrust bearing of the screws are arranged at the feet of the columns. Thus, the columns are subjected practically solely to vertical thrusts directed downwardly, thus giving them an excellent stability and allowing them to rest through their bases on the ground and eliminating any bracing or struts between them.

Moreover, since the crown 2 may slide along the polygonal part 1, the screw V may extend freely under the pull to which it is subjected.

In the embodiment above described, the runways are movable along the cross-bars T so that their spacing may be adapted to that of the wheels of the vehicle. To this end, each cross-bar T consists of a small beam, of double T-shape (Figs. 1 and 5), and each runway comprises a sheet-metal plate 24 resting on two irons 25 having a cross-section in the shape of a double T and arranged parallel one with the other. The ends of these irons 25 rest on the flanges of the double T-shaped small beams constituting the cross-bars. A pin 26, sliding in a guide 27 and provided with a handle 28 is adapted to engage in one or the other of bores 29 made in the beam T so as to constitute a bolt allowing of fixing the position of a runway.

Another advantage of the device described results from the fact that the apertures 17 are formed on the outer side of the columns and are protected by the semi-cylinders 23, so that the screws V are effectively protected against the impact of water and mud.

The bearings 9 are greased in a continuous and efficient manner due to the bores 13 and the conduits 14 and 15. Indeed, since the pinion 8 bathes in the oil contained in the casing 10, the meshing of the corresponding teeth of the pinion 8 with the crown 2 drives out the oil, remaining in the groove of a tooth, through the conduit 14, the bore 13 and the conduits 15. Thus, all the bearings 9 are greased automatically and in a continuous manner.

This greasing of the bearings is extremely important, because, since the transmission shafts are arranged in troughs, all the members of the transmission mechanism are very much exposed to the impact of the washing water and are only very seldom regularly kept in good condition.

In the second embodiment shown in Figs. 6 to 10, the lifting device also comprises four columns A, B, C, D protecting four screws V suspended and mechanically connected, by means of swivelling nuts, to the four ends of two cross-bars T carrying two runways R. All these elements are in every way similar to those described above with reference to Figs. 1 to 5.

On the other hand, in this second embodiment, each screw V is driven by its individual motor MA, MB, MC, MD, through the intermediary of a speed reducer.

To this end, the upper end of each screw V is provided with a part 30, of polygonal or grooved cross-section, on which engages a drum 31 having inner teeth 32. These latter mesh with two planet-gears 37 whose axes 33 are fixed. These planet-gears are driven rotatably by a pinion 34 secured to the end of a shaft 35 connected by means of a coupling 36 to the driving motor of the screw V in question. These motors are each located in the extension of the axis of their screws so that they constitute, as it were, the heads of the columns A, B, C, D of the lifting device. The speed reducer described is enclosed in a casing 39 provided with a lid 40 on which are secured the axes 33.

Figure 8:
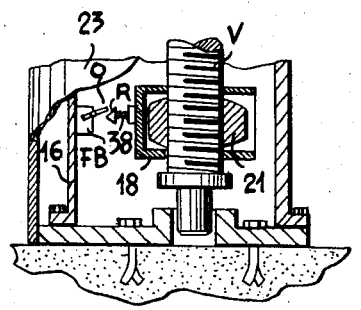

At the foot and at the top of each column there is disposed an end switch FB and FH the operating members O of which are arranged so as to be actuated by a dog $k$ subjected to the action of a spring 38 and carried by the tubes 18 rigidly secured to each of the ends of the cross-bars T (Figs. 7 and 8).

Figure 9:
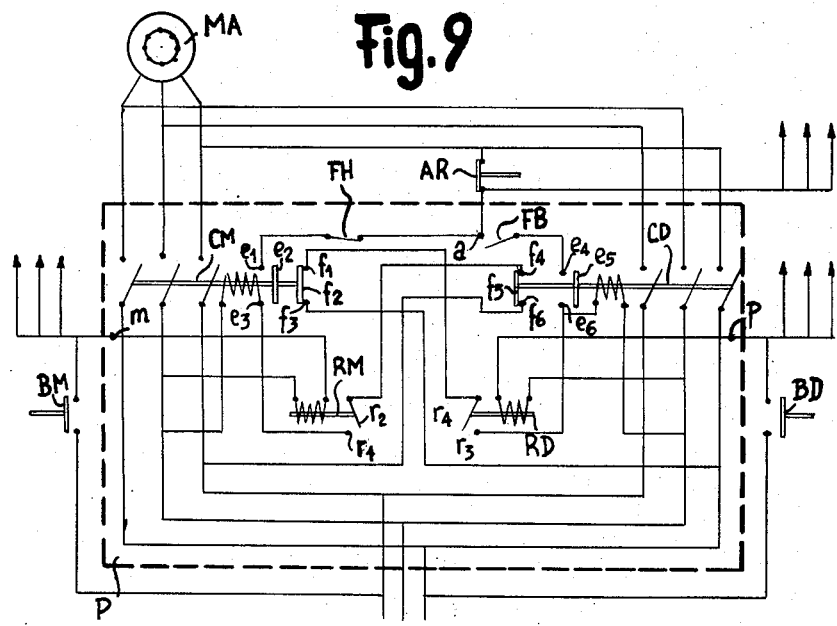
Fig. 9 shows the electric diagram of the control station of a motor.
Figure 10:
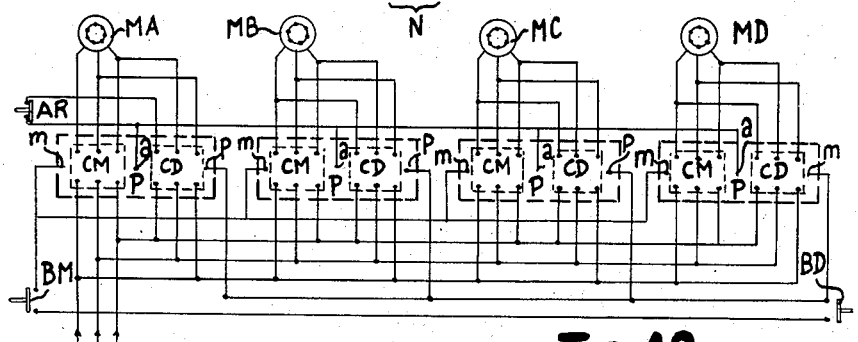
Fig. 10 shows the general diagram of electrical connections of the device.

The fundamental diagram of the electrical device for controlling the starting and stopping of the motors is shown in Figs. 9 and 10 of the accompanying drawing.

Each motor is controlled by a control station P comprising two starting relays CM and CD connecting the motor to an electrical power network N, the end switches FB and FH being inserted in the maintenance circuits of the said starting relays and of relays RM and RD. The relay RM comprises on the one hand a switch $r_1$, $r_2$ inserted in the feeding circuit of the exciting winding of the starting relay CM, and on the other hand an exciting winding connected to the network through the intermediary of a terminal $m$ and a general operating member BM constituted by a closure push-contact.

The relay RD is provided on the one hand with a switch $r_3$, $r_4$ inserted in the feed circuit of the exciting winding of the starting relay CD, and on the other hand an exciting winding connected to the network through the intermediary of a terminal $p$ and a general operating member BD constituted by a closure push-contact. Finally, the end switches FB and FH are connected to one of the feed conductors of the motor MA through the intermediary of a terminal $a$ and a general operating member AR constituted by an opening push-contact.

The operation of the lifting device described is very simple. Indeed, when the user pushes on the push-button BM, he brings about the feeding of the exciting windings of each of the relays RM and thus the closing of the switches $r_1$, $r_2$. As a result, the exciting windings of each of the four starting relays CM are supplied and bring about the closing of their principal contacts and the simultaneous feeding of the four motors MA, MB, MC, MD. Each of these drives a screw V through the intermediary of the speed reducers in the direction of rotation causing the raising of the movable outfit.

When the user releases the push-button BM, each switch $r_1$, $r_2$ opens but the four starting relays CM remain in engaged position since their windings remain supplied with current by four maintenance switches $e_1$, $e_2$, $e_3$, the four end switches FH and the stop pusher AR.

On the other hand, a safety switch $f_1$, $f_2$, $f_3$, inserted in each of the feeding circuits of the windings of the four starting relays CD and the opening of each of which are controlled by the closing of the starting relays CM, prohibits the feeding and therefore the closing of the starting relays CD, for as long as the starting relays CM are in the closed position.

The simultaneous stopping of the four motors is controlled by a thrust exerted on the push-button AR.

In case the user, inadvertently, does not cause the motors to stop at the necessary moment, the dogs k, actuating the operating members O of the end switches FH, bring about the individual automatic stopping of each of the motors before the nuts 21 reach the upper ends of the threads of the screws V.

In actuating the push-button BD, the user brings about the feeding of the four relays RD and the closing of each switch $r_3$, $r_4$ and therefore the supplying of the exciting windings of the four starting relays CD through the intermediary of the four safety contacts $f_1$, $f_2$, $f_3$. The four motors are then brought under tension by the closing of the four starting relays CD and rotate in the reverse direction so that the nuts 21 and with them all the movable outfit are driven downwards. When the user releases the push-button BD, the feeding of the exciting windings of each of the starting relays CD is assured by the four maintenance switches $e_4$, $e_5$, $e_6$.

At the end of the downward travel, the dogs k actuate the operating members O of the switches FB. The opening of each end switch FB brings about the individual stopping of the motor which it controls. In this manner, in the event of the motors having slightly different speeds of rotation, the horizontality of the platform is automatically restored by each downward travel of the movable outfit, this latter having to be in fact necessarily brought to its extreme low position in order to allow the withdrawal or the positioning of a vehicle.

From the above, it will easily be understood that the device, object of the invention, offers very great advantages relative to all the known lifting devices. As a matter of fact, due to the fact that the movable outfit is suspended by its four ends and that, furthermore, the nuts 21 are free to swivel relative to the ends of the crossbars T, the columns A, B, C, D are practically only subjected to vertical forces tending to press their bases against the ground so that any strut or brace connecting them rigidly one to the other is quite unnecessary.

In fact, practical trials have proved it to be possible to lift a motor bus for example with the help of a device such as the one described, the columns of which are not bedded in the ground, which truly proves that the same are not subjected to horizontal forces tending to overthrow them, as is the case with all the known lifting devices of the same kind.

Moreover, as described with reference to Figs. 6 to 10, it is possible to produce a lifting device in which all the members and elements are located above the level of the ground, thus on the one hand allowing of protecting in an efficient manner the mechanical and electrical members against the impact of the washing water and, in addition, allows of placing such a device directly on a reinforced concrete floor.

Two embodiments of the lifting device have been here described by way of example and with reference to the accompanying drawing, but it is obvious that all the cited members and elements may, as a matter of course, be replaced by their equivalents. Moreover, the electrical control circuits may be completed and comprise safety members of known types and of common use, such as deficiency of tension relays, maximum intensity relays, etc.

I claim:

1. In a lifting device, the combination, comprising, four tubular columns vertically ground supported and forming a rectangle, a tube constituting a part of each column and having a vertical slot, a lifting frame including load engaging members and crossbars, the latter supporting the ends of the load engaging members, frame supporting means at the opposite ends of each crossbar embracing a related tube, a screw in each tube, a nut on each screw, means for connecting each nut with the said frame supporting means whereby movement of the screw will actuate said crossbar, means at the lower end of each screw for journaling the same for rotary movement in either direction, motor means for rotating the screws, and shields one for each column and surrounding the slotted portion of each tube.

2. In a lifting device comprising four tubular columns vertically ground supported and forming a rectangle, a tube constituting a part of each column and having a vertical slot, a lifting frame including load engaging members and crossbars each supporting the ends of the load engaging members, frame supporting means at the opposite ends of each crossbar surrounding a related column, screws one in each tube, nuts one for each screw, journal means for each nut and affixed to one end of a crossbar and having registering openings for the screw, frame supporting means at opposite ends of each crossbar surrounding a related tube and each connected to a nut, the latter having a lengthwise slot opposite to and remote from the slot of the other tube of the same pair, each of said slots receiving the said frame supporting means between one end of the crossbar and the nut-journaling tube, motor means for rotating the screws, and shields one for each column and surrounding the portions thereof having the slot.

3. The combination according to claim 2 and wherein each screw is suspended from its tube.

4. The combination according to claim 3 and wherein the motor means is a single motor and also comprising a speed reducer.

5. The combination according to claim 3 and wherein the motor means comprises a motor for each screw and also comprising a speed reducer for each motor.

6. The combination according to claim 5 and wherein each motor and speed reducer is mounted at the head of a column.

7. In a lifting device, the combination, comprising four tubular columns vertically ground supported and forming a rectangle, a tube constituting a part of each column and having a vertical slot, a lifting frame including load engaging members and crossbars, the latter supporting the ends of the load engaging members, each tube being disposed perpendicularly to the longitudinal axis of its crossbar, frame supporting U-shaped members each at one of the opposite ends of each crossbar embracing a related tube, a screw in each tube, a nut on each screw, means for connecting each nut with the said frame supporting means whereby movement of the screw will actuate said crossbar, means at the lower end of each screw for journaling same for rotary movement in either direction, motor means for rotating the screws and shields one for each column and surrounding the slotted portion of each tube.

8. The combination according to claim 7 and wherein each nut is affixed to the U-shaped member by a securing element slidable in the slot.

9. In a lifting device comprising four tubular columns vertically ground supported and forming a rectangle, a tube constituting a part of each column and having a vertical slot, a lifting frame including load engaging members and crossbars each supporting the ends of the load engaging members, the load engaging members being movable along the crossbars, bolt means fixing the positions of the load engaging members, frame supporting means at the opposite ends of each crossbar surrounding a related column, screws one in each tube and suspended therefrom, nuts one for each screw, journal means for each nut and affixed to one end of a crossbar and having registering openings for the screw, frame supporting means at opposite ends of each crossbar surrounding a related tube, the latter having a lengthwise slot opposite to and remote from the slot of the other tube of the same pair, each of said slots receiving the said frame supporting means between one end of the crossbar and the nut-journaling tube, motor means for rotating the screws and shields one for each column and surrounding the portions thereof having the slot.

JULIO VILLARS.

References Cited in the file of this patent

UNITED STATES PATENTS

| Number | Name | Date |
|---|---|---|
| 1,963,022 | Kettelson | June 12, 1934 |
| 2,124,726 | Blum | July 26, 1938 |
| 2,230,534 | Elmer et al. | Feb. 6, 1941 |
| 2,252,166 | Clauson et al. | Aug. 12, 1941 |

FOREIGN PATENTS

| Number | Country | Date |
|---|---|---|
| 848,074 | France | July 17, 1939 |